(12) United States Patent
Peterson

(10) Patent No.: US 9,377,119 B2
(45) Date of Patent: Jun. 28, 2016

(54) SOLENOID ACTUATED BUTTERFLY VALVE

(71) Applicant: Flextronics Automotive, Inc., Milpitas, CA (US)

(72) Inventor: Matthew Peterson, Ada, MI (US)

(73) Assignee: Flextronics Automotive, Inc., Milpitas, CA (US)

( * ) Notice: Subject to any disclaimer, the term of this patent is extended or adjusted under 35 U.S.C. 154(b) by 14 days.

(21) Appl. No.: 14/297,154

(22) Filed: Jun. 5, 2014

(65) Prior Publication Data

US 2015/0059896 A1 Mar. 5, 2015

(51) Int. Cl.

| | |
|---|---|
| *F16K 27/00* | (2006.01) |
| *F16K 11/048* | (2006.01) |
| *F16K 11/074* | (2006.01) |
| *F16K 31/06* | (2006.01) |
| *F16K 31/10* | (2006.01) |
| *F16K 11/052* | (2006.01) |
| *H01F 7/121* | (2006.01) |
| *H01F 7/13* | (2006.01) |
| *H01F 7/16* | (2006.01) |

(52) U.S. Cl.
CPC ............. *F16K 27/003* (2013.01); *F16K 11/048* (2013.01); *F16K 11/052* (2013.01); *F16K 11/0743* (2013.01); *F16K 31/0603* (2013.01); *F16K 31/0624* (2013.01); *F16K 31/0627* (2013.01); *F16K 31/105* (2013.01); *H01F 7/121* (2013.01); *H01F 7/13* (2013.01); *H01F 7/1607* (2013.01); *H01F 7/1615* (2013.01); *Y10T 137/86855* (2015.04)

(58) Field of Classification Search
CPC . F16K 27/003; F16K 11/052; F16K 31/0627; F16K 31/105; F16K 31/0624; F16K 31/0603; F16K 11/048; F16K 11/0525; F16K 1/20; F16K 1/2014; F16K 1/222; H01F 7/1615; H01F 7/121; H01F 7/1607; H01F 7/13; Y10T 137/87788; Y10T 137/87812; Y10T 137/87829; Y10T 137/87837; Y10T 137/87869; Y10T 137/86847; Y10T 137/86855; Y10T 137/87531; Y10T 137/7753; Y10T 137/6048; Y10T 137/0525
USPC .......................... 137/872, 875, 877, 878, 882, 137/625.44–625.45, 601.17, 484, 315.22, 137/15.25; 251/228, 301–303, 229, 305, 251/173
See application file for complete search history.

(56) References Cited

U.S. PATENT DOCUMENTS

| | | | | | |
|---|---|---|---|---|---|
| 1,267,898 | A | * | 5/1918 | Parish | ..................... F23L 15/02 251/305 |
| 2,271,390 | A | * | 1/1942 | Dodson | .................. F02M 19/00 251/305 |
| 2,361,006 | A | * | 10/1944 | Brown | ................... G05D 23/08 251/305 |

(Continued)

FOREIGN PATENT DOCUMENTS

| | | | | | |
|---|---|---|---|---|---|
| DE | 102005038185 | * | 2/2007 | ............ | F16K 1/2007 |
| EP | 1462697 A1 | * | 9/2004 | ............ | F16K 1/2007 |
| WO | 2007/005424 A1 | | 1/2007 | | |

*Primary Examiner* — Michael R Reid
(74) *Attorney, Agent, or Firm* — Volpe and Koenig, P.C.

(57) ABSTRACT

A butterfly valve and a valve system using the butterfly valve are disclosed. The butterfly valve includes a valve body and a valve disk disposed in the body such that the valve disk may be rotated between at least a first position and a second position using a linear actuator. The actuator may be a linear solenoid coupled to the valve disk spaced a distance from the axis of rotation of the valve disk.

17 Claims, 5 Drawing Sheets

(56) References Cited

U.S. PATENT DOCUMENTS

| | | | |
|---|---|---|---|
| 3,254,660 A | 6/1966 | Ray | |
| 4,156,439 A * | 5/1979 | Jeffries | F16K 11/0525 137/625.46 |
| 4,807,665 A * | 2/1989 | Schiel | F16K 11/0525 137/625.4 |
| 2003/0192606 A1 * | 10/2003 | Heckt | F01N 3/031 137/875 |

* cited by examiner

SOLENOID ACTUATED BUTTERFLY VALVE

CROSS REFERENCE TO RELATED APPLICATION

This application claims the benefit of U.S. Provisional Application No. 61/872,178 filed Aug. 30, 2013, the contents of which is herein incorporated by reference as if fully set forth.

FIELD OF INVENTION

Embodiments of the present invention generally relate to butterfly valves and valve systems using a butterfly valve.

BACKGROUND

Butterfly valves may be used in valve systems in which high flow with minimal pressure drop across the valve is desired. Butterfly valves generally include a round valve disk positioned in the center of a bore in which flow is to be controlled. The disk is affixed to a shaft such that rotation of the shaft causes rotation of the disk between at least a first position in which flow in the bore is blocked and a second position in which the bore is open to flow. The disk typically rotates about one quarter turn (90°) between the first and second positions and is often rotated incrementally between the two positions to throttle flow. An actuator outside the bore is couple to the shaft, often via a linkage or gearing, to rotate the shaft and the valve disk.

The actuator for typical automatically operated butterfly valves includes a motor coupled to the shaft directly or via gearing to impart rotation to the shaft. The actuator is sized to impart a full quarter turn to the valve disk, making the overall size of the valve and actuator larger than necessary when less than a quarter turn is desired. Therefore, a need exists for a compact, solenoid operated butterfly valve having a valve disk operative over less than one quarter turn.

SUMMARY

In a preferred embodiment, a butterfly valve includes a valve body having a plurality of apertures and a passage between them. A valve disk is disposed in the passage and supported for rotation about an axis of rotation. An actuator, linked to the valve disk at a point offset from the axis of rotation, rotates the disk about the axis of rotation in response to linear displacement of the actuator.

In other embodiments, a valve system comprises a manifold body with a central bore and a plurality of conduits disposed about the manifold body. The plurality of conduits corresponds in number with a plurality of apertures in the valve body, and is located in alignment with the conduits. The butterfly valve also includes a valve disk and a linear actuator. The plurality of conduits corresponds in number and location with the apertures of the valve body, such that the apertures align with the conduits.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings.

To facilitate understanding, identical reference elements have been used where possible to designate identical elements that are common to the figures.

DETAILED DESCRIPTION

An inventive butterfly valve and a valve assembly employing the inventive butterfly valve are provided herein. The inventive butterfly valve advantageously provides a high flow rate and low pressure drop across the butterfly valve. For purposes of this disclosure, a high flow rate and low pressure drop can be characterized by a valve having a flow coefficient (Cv) of greater than 1.0 and less than 50.0. Preferred embodiments of the disclosed butterfly valve have a Cv of 3.1.

Figure 1:
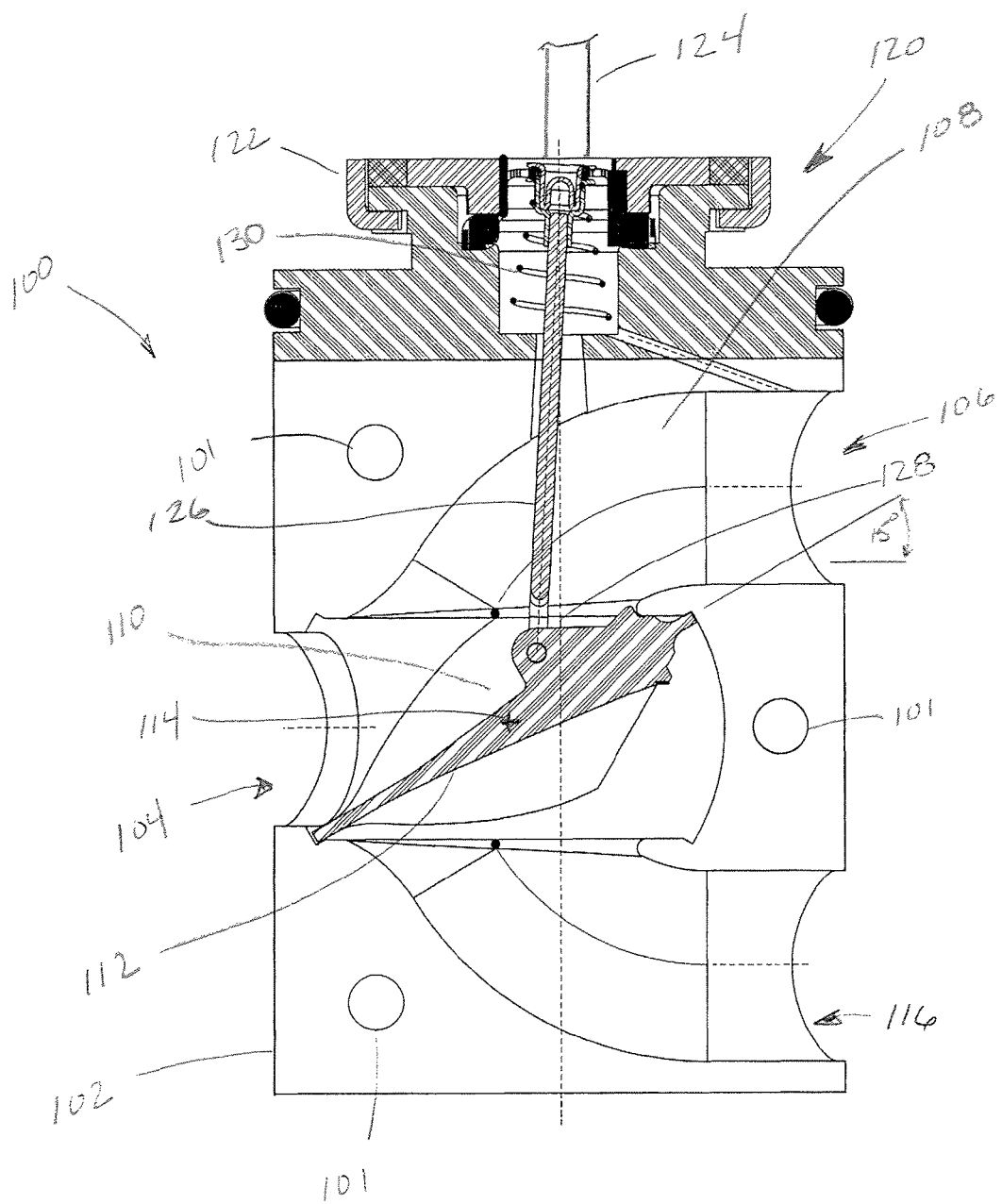
FIG. 1 depicts a sectional side view of a butterfly valve according to an embodiment of the present invention in a first position.
Figure 2:
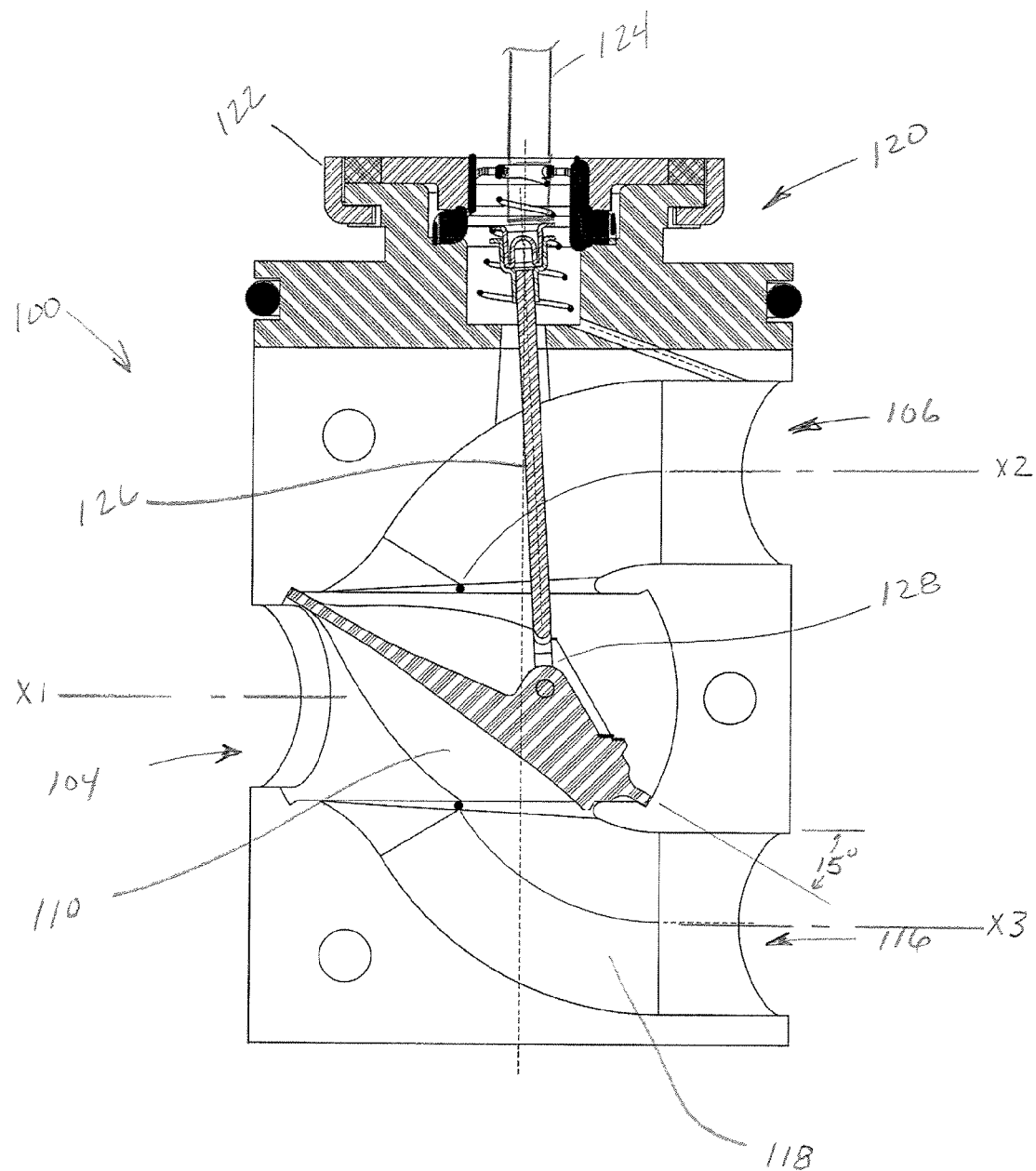
FIG. 2 depicts the butterfly valve according to FIG. 1 in a second position.

FIGS. 1 and 2 depict sectional views along a center line of a butterfly valve 100 in accordance with an embodiment of the present invention. The opposite half of the valve 100, i.e., the portion not shown in the sectional view, is a mirror image of the illustrated section. The half illustrated in FIGS. 1 and 2 and the opposite half (not shown) may be formed separately and joined together, for example by fasteners (not shown) disposed at least partially in through-holes 101 (3 shown).

The butterfly valve 100 comprises a valve body, body 102, having a first aperture 104 and a second aperture 106 in selective fluid communication with each other via a first flow channel 108 and a passage 110. The first aperture 104 is formed on a first portion of the body 102 and has a first axis X1. The second aperture 106 is formed on a second portion of the body 102 and has a second axis X2. Axis X2 is shown parallel to the first axis X1; however, the first axis X1 and the second axis X2 do not need to be parallel and/or coplanar.

A valve disk 112 disposed within the passage 110 and supported for rotation about an axis 114 selectively provides fluid communication between the first aperture 104 and the second aperture 106. Support for rotation may be provided by a separate shaft or by protrusions integrally formed with the valve disk 112 as discussed below. The valve disk 112 is selectively rotated to a first position as illustrated in FIG. 1 wherein first aperture 104 is at least partially open to fluid communication with second aperture 106. The valve disk 112 is selectively rotated to a second position as illustrated in FIG. 2, wherein the first aperture 104 is blocked from fluid communication with the second aperture 106 by the valve disk 112.

The body 102 may be provided with an optional third aperture 116 in fluid communication with the first aperture 104 via a second flow channel 118 and the passage 110. The third aperture is formed on a third portion of the body 102 and has a third axis X3 that may lie in plane and parallel with axes X1 and X2 or may lie in any plane and be oriented at any angle to axes X1 and X2.

The valve disk 112 may be selectively positioned as in FIG. 1 to block the first aperture 104 from fluid communication with the second aperture 106. In FIG. 2, the condition is reversed, and first aperture 104 is in fluid communication with third aperture 116 and is blocked from fluid communication with second aperture 106 by the valve disk 112.

The first, second and third apertures, 104, 106 and 116, respectively, may be formed such that the axis of the apertures X1, X2, and X3, respectively, are parallel as illustrated in FIG. 2. Alternately, the apertures may be formed such that one or more of the axis of the apertures are not parallel. For example, the axis X2 of the second aperture 106 forms a first angle other than 180° with the axis X1 of the first aperture 104. In other embodiments, the axes X1, X2, and X3 of the first, second and third apertures 104, 106, 116, respectively, may each lie in a separate plane, wherein the axes form an angle with each other. For example, first aperture 104 axis X1 and second aperture 106 axis X2 may lie in the plane of the sheet as drawn and are parallel as illustrated in FIG. 2. Third aperture 116 axis X3 may be perpendicular to both X1 and X2, i.e., lies in a plane perpendicular to the plane of the sheet (see FIG. 4).

The valve disk 112 may be positioned in a third position (not shown) in which the valve disk 112 is oriented such that both the second aperture 106 and the third aperture 116 are in fluid communication with the first aperture 104 through the passage 110. The valve disk 112 may be positioned in any intermediate position between the first position of FIG. 1 and the second position of FIG. 2 to provide simultaneous fluid communication between first aperture 104, second aperture 106, and third aperture 116.

The valve disk 112 may rotate about the axis of rotation 114 from a horizontal position, generally parallel to X1, in a counterclockwise direction to about +90° or in a clockwise direction to about −90°, for a range of rotation of about 180°, or to any intermediate rotation therebetween. For example, as illustrated in FIGS. 1 and 2, the valve disk 112 rotates about 30°, which is about ±15° from the horizontal position. In other embodiments, the positive (counterclockwise) and negative (clockwise) rotations need not be equal.

The valve disk 112 is linked to a linear actuator, actuator 120, for example a solenoid 122. The solenoid 122 has an armature 124 supported for linear displacement perpendicular to the axis of rotation 114 of the valve disk 112. The armature 124 may be directly linked to the valve disk 112 or may be linked via a linkage 126 comprising one or more segments (one shown in FIGS. 1 and 2). A first end 128 of the linkage 126 is coupled to the valve disk 112 such that the first end 128 is supported for at least rotational displacement with respect to the valve disk 112. The linkage 126 is coupled to the valve disk at a location offset from the axis of rotation 114 such that the valve disk 112 rotates about the axis of rotation 114 in response to a linear displacement of the actuator 120. The linkage 126 between the actuator 120 and the valve disk 112 may be a separable link or an inseparable (permanent) link.

Figure 3:
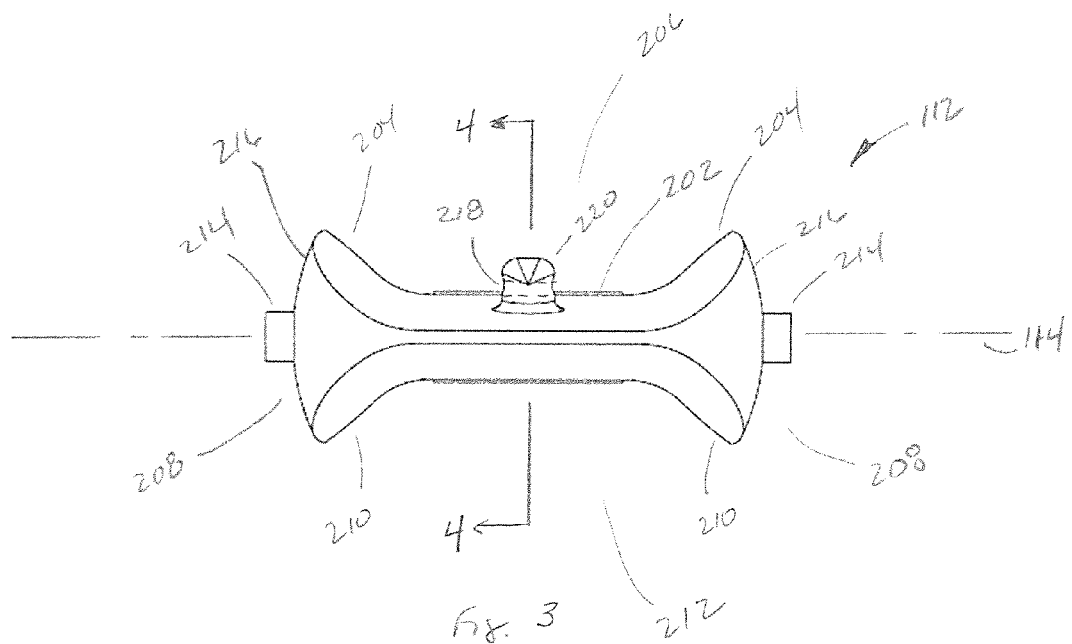
FIG. 3 depicts a front view of the valve disk in accordance with embodiments of the present invention.
Figure 4:
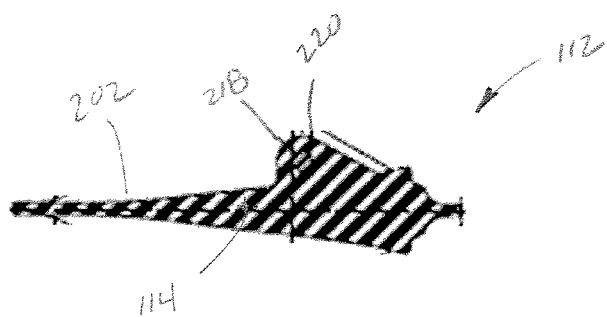
FIG. 4 depicts a side sectional view of a valve disk according to FIG. 3 taken along line 4-4.

As illustrated in FIGS. 3 and 4, the valve disk 112 comprises a centrally located portion 202 that is generally planar. The axis of rotation 114 passes through the entire valve disk 112. The disk portion 202 comprises first concave portions 204 formed on a first side 206 adjacent the support ends 208. Second, oppositely directed concave portions 210 are similarly formed on a second side 212. As illustrated, first concave portions 204 and second concave portions 210 are similarly configured; however, they may be differently configured. Bearing surfaces 214 are concentrically formed about the axis of rotation 114 adjacent the support ends 208 to support the valve disk 112 in rotation within the body 102 where suitable receptacles (not shown) for the bearing surfaces 214 are formed. In an alternate embodiment, bearing surfaces 214 are not formed as part of the valve disk 112. Instead, a passage is formed through the valve disk concentric with the axis of rotation 114 to accept a suitable sized axel or pin that provides the function of the bearing surface 214 to support the valve disk 112 in rotation.

In the embodiment illustrated, spherical surfaces 216 are formed adjacent each bearing surface 214. The spherical surfaces 216 may cooperate with portions of the passage 110, or portions of the first and second flow channels 108, 118, or portions of both the central bore and the first and second flow channels, to provide sealing surfaces to facilitate selectively blocking the first aperture 104 from fluid communication with one of the second and third apertures 106, 116.

A connection point 218 is provided on the first side 206 of the valve disk 112 to facilitate connection with the actuator 120. The connection point may be provided in a boss 220 which may be integrally formed with the valve disk 112 as illustrated in FIGS. 3 and 4. Alternately, the connection point may be separately formed and disposed on the valve disk 112 with, for example, fasteners or adhesive.

The connection point 218 is offset from the axis of rotation 114 when the valve disk is mounted in the body 102 such that linear motion of an actuator linked to the valve disk 112 causes a torque about the axis of rotation 114 sufficient to rotate the valve disk 112 about the axis of rotation 114. As illustrate on FIG. 4, the connection point 218 is offset from the axis of rotation 114 in both the horizontal (i.e., parallel to the planar disk portion 202) and vertical (i.e., perpendicular to the planar disk portion 202) directions as drawn. However, the connection point need only be offset from the axis of rotation 114 in the horizontal direction (as drawn) in order to cause a torque about the axis of rotation 114.

The geometry of the valve disk 112 and body 102 are selected so as to minimize the torque required to redirect a fluid flow within the valve 100.

Returning to FIG. 1, the valve disk 112 is illustrated in a first position which may correspond to a default condition. The default condition may correspond with a first energy condition of the actuator 120, for example a de-energized condition of the solenoid 122. In the de-energized position of FIG. 1, a resilient member, for example spring 130, urges the linkage 126 in the upward direction to position the valve disk in the illustrated orientation of FIG. 1. In FIG. 2, the valve disk 112 is illustrated in the second position which may correspond to a second energy condition of the actuator 120, for example an energized condition of the solenoid 122.

In the energized condition of FIG. 2, the solenoid overcomes the upward (as drawn) urging of the resilient member 130 and displaces the linkage 126 downward, imparting a clockwise moment about the axis of rotation 114, to position the valve disk 112 in the orientation illustrated in FIG. 2. A third position may be provided as discussed above in which the valve disk 112 is incrementally rotated between the first position and the second position. The third position may correspond to a third energy condition of the solenoid or may correspond to one of the first or second energy conditions described above with the use of an extension limiter, for example a physical stop.

The body 102 and valve disk 112 may be formed from any material suitable for the environment in which it is used, including, as non-limiting examples, filled or unfilled polyamide. The linkage 126 may be formed from any environment suitable material with sufficient rigidity, including, as a non-limiting example, steel alloys such as 302 stainless steel.

Figure 5:
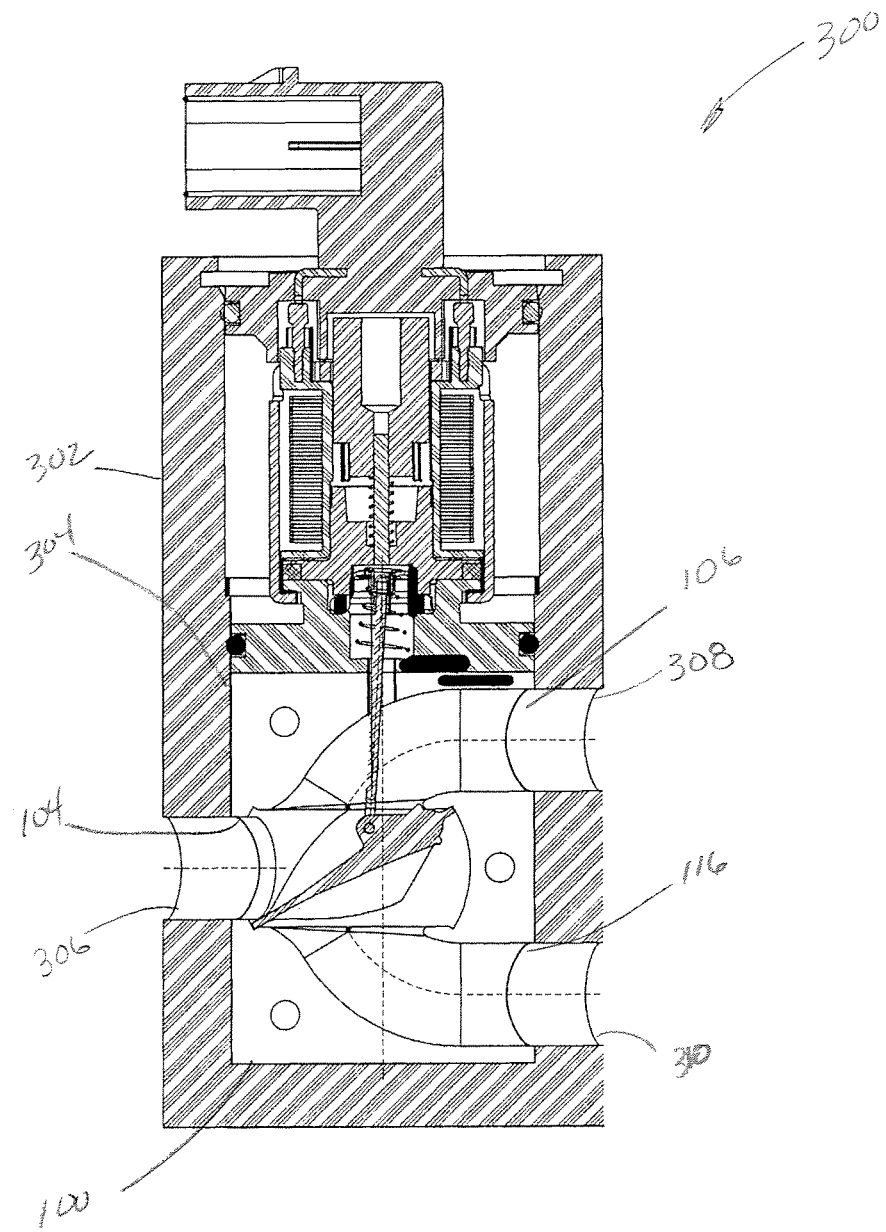
FIG. 5 depicts a side sectional view of a valve assembly in accordance with an embodiment of the present invention.

FIG. 5 is illustrative of a valve assembly 300 comprising the butterfly valve 100 disposed within a central bore 304 formed in a manifold body 302. A plurality of conduits corresponding to the number of apertures in the butterfly valve 100 are disposed about the manifold body 302 and are in fluid communication with the central bore 304. The conduits are positioned such that they align with the apertures in the butterfly valve 100. As illustrated, first conduit 306 aligns with first aperture 104, second conduit 308 aligns with second aperture 106, and third conduit 310 aligns with third aperture 116 such that each conduit and the corresponding aperture are in fluid communication. Accordingly, when the butterfly valve 100 is in the first, or de-energized, position of FIGS. 1 and 5, first conduit 306 is in fluid communication with second conduit 308 through the passage 110 and second flow channel 108, and fluid communication is blocked between first conduit 306 and third conduit 310. Similarly, when the butterfly valve 100 is in the second, or energize, position of FIG. 2, first conduit 306 is in fluid communication with third conduit 310 through the passage 110 and third aperture 116, and fluid communication is blocked between first conduit 306 and second conduit 308. In the third position discussed above, first conduit 306 is in fluid communication with second conduit 308 and third conduit 310.

Conduit 306 may be a single flow input with the valve disk 112 diverting the flow to one of the second conduit 308 or the third conduit 310 or modulating the flow between both of the second conduit 308 and the third conduit 310 as an outlet. Alternately, second and third conduits 308, 310 may be flow inputs with the valve disk 112 diverting one of the flows to the first conduit 306 as an output, or the valve disk may provide an outlet flow to the first conduit 306 including flows from both the second and third conduits 308, 310.

Figure 6:
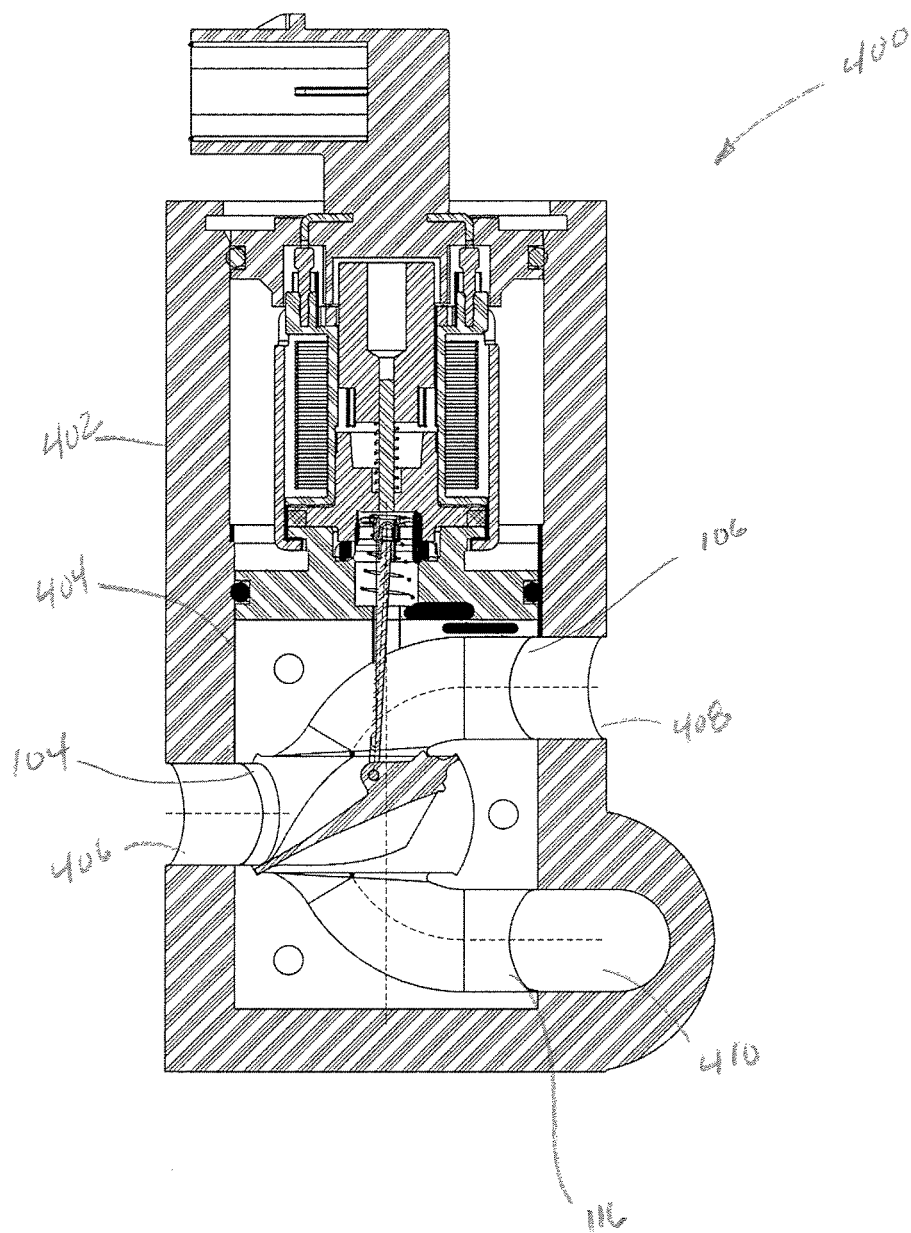
FIG. 6 depicts a side sectional view of a valve assembly in accordance with an embodiment of the present invention.

FIG. 6 is illustrative of a valve assembly 400 comprising the butterfly valve 100 disposed within a central bore 404 in the manifold 402. Similar to valve assembly 300 above, first conduit 406 aligns with first aperture 104, second conduit 408 aligns with second aperture 106, and third conduit 410 aligns with third aperture 116 such that each conduit and the corresponding aperture are in fluid communication.

As illustrated in FIG. 6, when the solenoid is in a de-energized, first conduit 406 is in fluid communication with second conduit 408 through the passage 110 and second flow channel 108, and fluid communication is blocked between first conduit 406 and third conduit 410. Similar to the above, the fluid communication is modified when the solenoid is in the energized position.

In the embodiment of FIG. 6, the axes of conduit 406 and first aperture 104 are collinear and are coplanar with collinear axes of conduit 408 and second aperture 106. The axes for conduit 410 and second aperture 106 in FIG. 6 are collinear and form an obtuse angle with the plane of conduit 406 and conduit 408. For example, the axes of conduits 406 and 408 lie in the page as drawn and the axis of conduit 410 is perpendicular to the page. Other angular orientations are anticipated as well.

What is claimed is:

1. A butterfly valve comprising:
   a valve body having a first aperture, a second aperture, and a third aperture;
   a first flow channel extending between the first aperture and the second aperture and a second flow channel spaced from the first flow channel and extending between the first aperture and the third aperture;
   a passage, having a portion disposed between the first flow channel and the second flow channel;
   a valve disk disposed within the passage and supported for rotation about an axis of rotation, the valve disk comprising:
   a first end proximal to the first aperture and a second end distal to the first aperture and opposite the first end;
   a first portion extending from the axis of rotation in a first direction to the first end and a second portion extending from the axis of rotation in a second direction opposite the first direction to the second end, the second portion configured to rotate about the axis of rotation within the passage between the first flow channel and the second flow channel; and
   an actuator that linked to the valve disk at a connection point offset from the axis of rotation so that the valve disk rotates about the axis of rotation in response to a linear displacement of the actuator,
   wherein the first portion and the second portion of the valve disk are configured to selectively rotate to (i) a first position at least partially opening the first aperture to fluid communication with the second aperture and closing the first aperture to fluid communication with the third aperture and (ii) a second position closing the first aperture to fluid communication with the second aperture and at least partially opening the first aperture to fluid communication with the third aperture, and
   wherein the actuator extends through the first or second channel in both the first and second positions.

2. The butterfly valve of claim 1, wherein the linear actuator comprises a solenoid having an armature supported for linear displacement perpendicular to the axis of rotation to rotate the valve disk between the first position and the second position, wherein the armature is linked to the valve disk.

3. The butterfly valve of claim 2, wherein the armature is linked to the valve disk via a linkage.

4. The butterfly valve of claim 2, wherein the first position of the armature corresponds to a first energy condition of the solenoid and the second position of the armature corresponds with a second energy condition of the solenoid.

5. The butterfly valve of claim 2, wherein the valve disk rotates through 30° of rotation from the first position to the second position.

6. The butterfly valve of claim 2, wherein the armature is linked to the valve disk through a valve pin having a first end operatively engaged with the armature and a second end pinned to the valve disk for rotation.

7. The butterfly valve of claim 1, wherein the valve disk is further configured to selectively rotate to a third position, between the first position and the second position, partially opening the first aperture to fluid communication with the second aperture and partially opening the first aperture to fluid communication with the third aperture.

8. The butterfly valve of claim 7, wherein the linear actuator comprises a solenoid having an armature supported for linear displacement perpendicular to the axis of rotation to rotate the valve disk between the first position and the second position, the armature is linked to the valve disk via a linkage, and
   the valve disk is caused to be in the first position by a first energy condition of the solenoid, wherein a resilient member urges the linkage in an upward direction,
   the valve disk is caused to be in the second position by a second energy condition of the solenoid, wherein the solenoid overcomes an upward urging of the resilient member and displaces the linkage downward, causing the valve disk to rotate about the axis of rotation, and
   the third position of the valve disk corresponds to a third energy condition of the solenoid different from the first and second energy conditions.

9. The butterfly valve of claim 8, wherein the valve disk is caused to be in the third position by one of the first energy condition or the second energy condition of the solenoid.

10. The butterfly valve of claim 1, wherein the first aperture is formed on a first portion of the valve body and has a first axis and the second aperture is formed on an opposite second portion of the valve body and has a second axis, wherein the first axis and the second axis are parallel to each other.

11. The butterfly valve of claim 10, wherein the third aperture is formed on a third portion of the valve body opposite the first aperture and having a third axis parallel to the first axis and the second axis.

12. The butterfly valve of claim 1, wherein the valve disk comprises:
a centrally located planar disk portion through which the axis of rotation passes, the disk portion having a first concave surface on a first side and an oppositely directed second concave surface on a second side; and diametrically opposed cylindrical bearing surfaces concentric with the axis of rotation configured to support the valve disk in rotation.

13. The butterfly valve of claim 12, wherein a boss disposed on the first side includes the connection point.

14. The butterfly valve of claim 12, wherein the connection point is offset from the axis of rotation in a direction parallel to the disk portion.

15. The butterfly valve of claim 12 further comprising a spherical surface adjacent each bearing surface.

16. A valve system, comprising:
a manifold body with a central bore and a plurality of conduits disposed about the manifold body in fluid communication with the central bore; and
the butterfly valve of claim 1 disposed within the central bore,
wherein the plurality of conduits corresponds in number and location with the apertures of the valve body, such that the apertures align with the conduits.

17. The valve system of claim 16, wherein:
the plurality of conduits includes a first conduit, a second conduit, and a third conduit, each disposed about the manifold body;
wherein the third aperture aligns with the third conduit when the butterfly valve is disposed in the central bore.

\* \* \* \* \*